(Model.)

J. E. IRWIN.
Multiplication Block.

No. 239,385.  Patented March 29, 1881.

WITNESSES
B. W. Williams
John M. Robertson

INVENTOR
John E. Irwin
by his atty,
Henry W. Williams

UNITED STATES PATENT OFFICE.

JOHN E. IRWIN, OF SAUGUS, ASSIGNOR TO MARY T. FOOTE, OF BOSTON, MASSACHUSETTS.

MULTIPLICATION-BLOCKS.

SPECIFICATION forming part of Letters Patent No. 239,385, dated March 29, 1881.

Application filed May 14, 1880. (Model.)

*To all whom it may concern:*

Be it known that I, JOHN E. IRWIN, of Saugus, in the county of Essex and State of Massachusetts, have invented a new and Improved Set of Educational Blocks, of which the following is a specification.

The objects of this invention are to familiarize the young with the multiplication-table, and to assist those who are partially or wholly color-blind, especially the young, in acquiring a knowledge of colors.

The ordinary multiplication-table—*i. e.*, from 1 time 1 to 12 times 12—is placed upon seventy-two blocks or cubes, each side of each cube being utilized so as to provide for the four hundred and thirty-two numbers in the multiplication-table. The six sides of the cubes are painted six different colors, the cubes being painted alike, and each problem, with its correct answer in multiplication, is placed upon sides of the same color of the three cubes required to contain the same. For example, the problem and answer "7 times 9 are 63," being correct, would appear 7 9 63 on the red sides of three blocks; but if the problem were incorrectly done—as 7 9 64, for example—the 7 and 9 would appear on red surfaces and the 64 on a blue surface. Thus the child learning the multiplication-table may learn when his problem and answer are correct by the colors corresponding, and the student of colors may know when the colors correspond by the correctness of the multiplication-table.

In the accompanying drawings, Figure 1 is a perspective view of my set of blocks with the red sides uppermost. They are arranged, for convenience sake, in two trays, *a b*, having handles *c*, and laid side by side in the box *d*. The first row of blocks in tray *a* contains the first half of the first of the twelve portions of the multiplication-table, and is colored and numbered as follows, viz: 1 1 1 on red sides, 2 1 2 on blue sides, 3 1 3 on white sides, 4 1 4 on black sides, 5 1 5 on yellow sides, 6 1 6 on green sides. The first row in tray *b* contains the latter half of the first of the twelve portions of the multiplication-table, and is as follows: 7 1 7, red; 8 1 8, blue; 9 1 9, white; 10 1 10, yellow; 11 1 11, green; 12 1 12, black.

Figure 1:
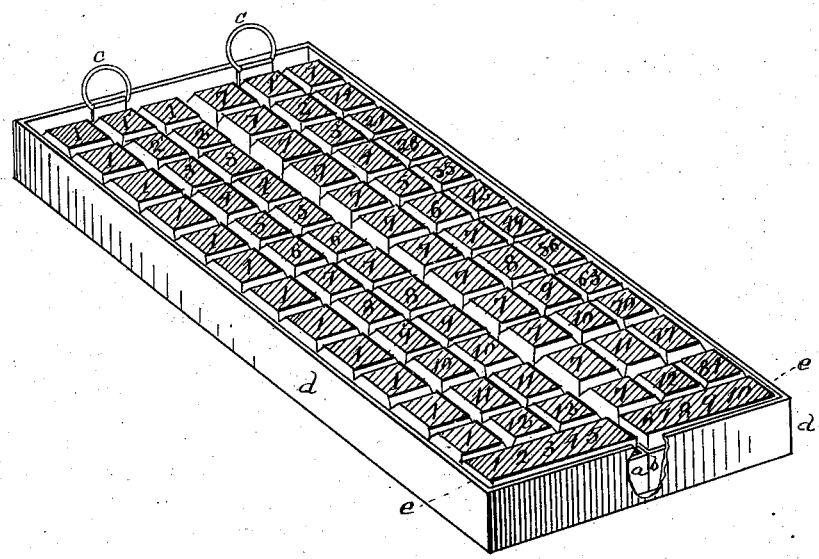
Figure 2:
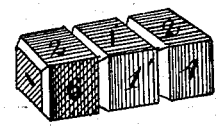
Fig. 2 shows the first row in tray *a* removed and having its blue sides uppermost, showing the problem and answer 2 1 2.
Figure 3:
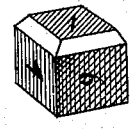
Figs. 3 and 4 show opposite perspective views of the first block in the first row of tray *a*, 1 being on the red side of the cube, 2 on the blue side, 3 white, 4 black, 5 yellow, 6 green. The remainder of the rows are similarly arranged, and, as will be readily perceived, complete the multiplication-table up to 12 12 144, which is in black on the last row of blocks in tray *b*.
Figure 4:
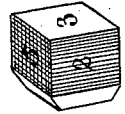

The long blocks *e e* are not essential to the invention, but are placed there to keep the small blocks in place, and usually have numbers printed upon their differently-colored sides.

Of course the blocks may be painted any colors or shades desired. The most common, and those most necessary to be taught to the color-blind, are here selected.

I am aware that it is not novel to utilize the six sides of a cube in making a multiplication-block, in order to lessen the number of blocks required to construct a set, and I do not claim that as new.

What I claim, and desire to secure by Letters Patent, is—

The hereinbefore-described set of educational blocks, the same consisting of a number of rows of cubical blocks, each transverse row comprising three similarly-painted blocks, each block having its sides painted in six colors or shades, and all the sides of the first two blocks exhibiting numbers to be multiplied, and those of the third block the results, arranged as described, so that the correctly-solved problems in multiplication are exhibited in the same color on the three blocks, and an incorrect sum in different colors, substantially as and for the purposes set forth.

JOHN E. IRWIN.

Witnesses:
EDWARD S. TAYLOR,
HENRY W. WILLIAMS.